(12) United States Patent
Kikuta et al.

(10) Patent No.: US 7,454,196 B2
(45) Date of Patent: Nov. 18, 2008

(54) MOBILE COMMUNICATIONS SYSTEM, MOBILE COMMUNICATIONS NETWORK CONTROLLER, MOBILE COMMUNICATIONS TERMINAL, AND METHOD OF CONTROLLING MOBILE COMMUNICATIONS NETWORK

(75) Inventors: Yoko Kikuta, Yokohama (JP); Kenji Sakamoto, Yokosuka (JP); Tsutomu Yokoyama, Yokohama (JP); Kenichi Yamazaki, Hino (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 11/737,008

(22) Filed: Apr. 18, 2007

(65) Prior Publication Data

US 2007/0190989 A1 Aug. 16, 2007

Related U.S. Application Data

(62) Division of application No. 11/203,212, filed on Aug. 15, 2005, now Pat. No. 7,340,245, which is a division of application No. 10/191,447, filed on Jul. 10, 2002, now Pat. No. 7,257,394.

(30) Foreign Application Priority Data

Jul. 10, 2001 (JP) ............................ P2001-210045

(51) Int. Cl.
*H04M 3/42* (2006.01)
(52) U.S. Cl. .............. 455/414.2; 455/426.1; 455/456.1; 455/556.1
(58) Field of Classification Search .............. 455/426.1, 455/456.1, 556.1, 414.2
See application file for complete search history.

(56) References Cited

U.S. PATENT DOCUMENTS

| 5,572,221 | A | 11/1996 | Marlevi et al. |
| 6,032,056 | A | 2/2000 | Reudink |
| 6,091,956 | A | 7/2000 | Hollenberg |
| 6,188,905 | B1 | 2/2001 | Rudrapatna et al. |
| 7,200,409 | B1 * | 4/2007 | Ichikawa et al. ......... 455/456.1 |

FOREIGN PATENT DOCUMENTS

| EP | 1 014 742 A1 | 6/2000 |
| GB | 2 327 175 | 1/1999 |
| GB | 2 333 664 | 7/1999 |
| JP | 7-38961 | 2/1995 |

(Continued)

*Primary Examiner*—Gerald Gauthier
(74) *Attorney, Agent, or Firm*—Oblon, Spivak, McClelland, Maier & Neustadt, P.C.

(57) ABSTRACT

A mobile communications system of the present invention obtains in advance information on communications environments in a mobile communications system and provides users with the information on communications environments. The mobile communications system also predicts the movement of users and provides seamless services based on the predictions.

A mobile communications system of the present invention includes an information acquisition unit for obtaining information regarding resources of a given object, an information memory for storing the obtained information on resources of a given object, and an information provision unit for searching the information memory in response to a request for provision of the information on resources of a given object transmitted from a mobile communications terminal, and providing the information on resources of a given object found in the search to the mobile communications terminal.

2 Claims, 8 Drawing Sheets

FOREIGN PATENT DOCUMENTS

| | | |
|---|---|---|
| JP | 8-274781 | 10/1996 |
| JP | 10-42360 | 2/1998 |
| WO | WO00/04730 | 1/2000 |
| WO | WO 01/11507 | 2/2001 |
| WO | WO 01/37597 | 5/2001 |
| WO | WO 01/43482 | 6/2001 |

* cited by examiner

FIG.3A

| DEVICE NAME | FUNCTION | INSTALLATION LOCATION |
|---|---|---|
| A | FULL SCREEN | aaa CAFE |
| B | PRINTER | ccc SECTION, bbb BUILDING |
| C | HI-FI | ddd HOUSE |
| ⋮ | ⋮ | ⋮ |

FIG.3B

| RADIO COMMUNICATIONS CHANNEL ID | SENSING AREA | RADIO BANDWIDTH |
|---|---|---|
| 1 | AA PLACE | Xbps |
| 2 | BB HOSPITAL | Ybps |
| 3 | CC HOUSE | Zbps |
| ⋮ | ⋮ | ⋮ |

FIG.3C

| START TIME | LOCATION INFORMATION | PROCESSING |
|---|---|---|
| α | xxx TUNNEL | BUFFERING FOR X SECONDS |
| β | yyy HOSPITAL | TEXT CONVERSION FOR Y MINUTES |
| γ | zzz HOUSE | TRANSMISSION OF MAINTENANCE INFORMATION |
| ⋮ | ⋮ | ⋮ |

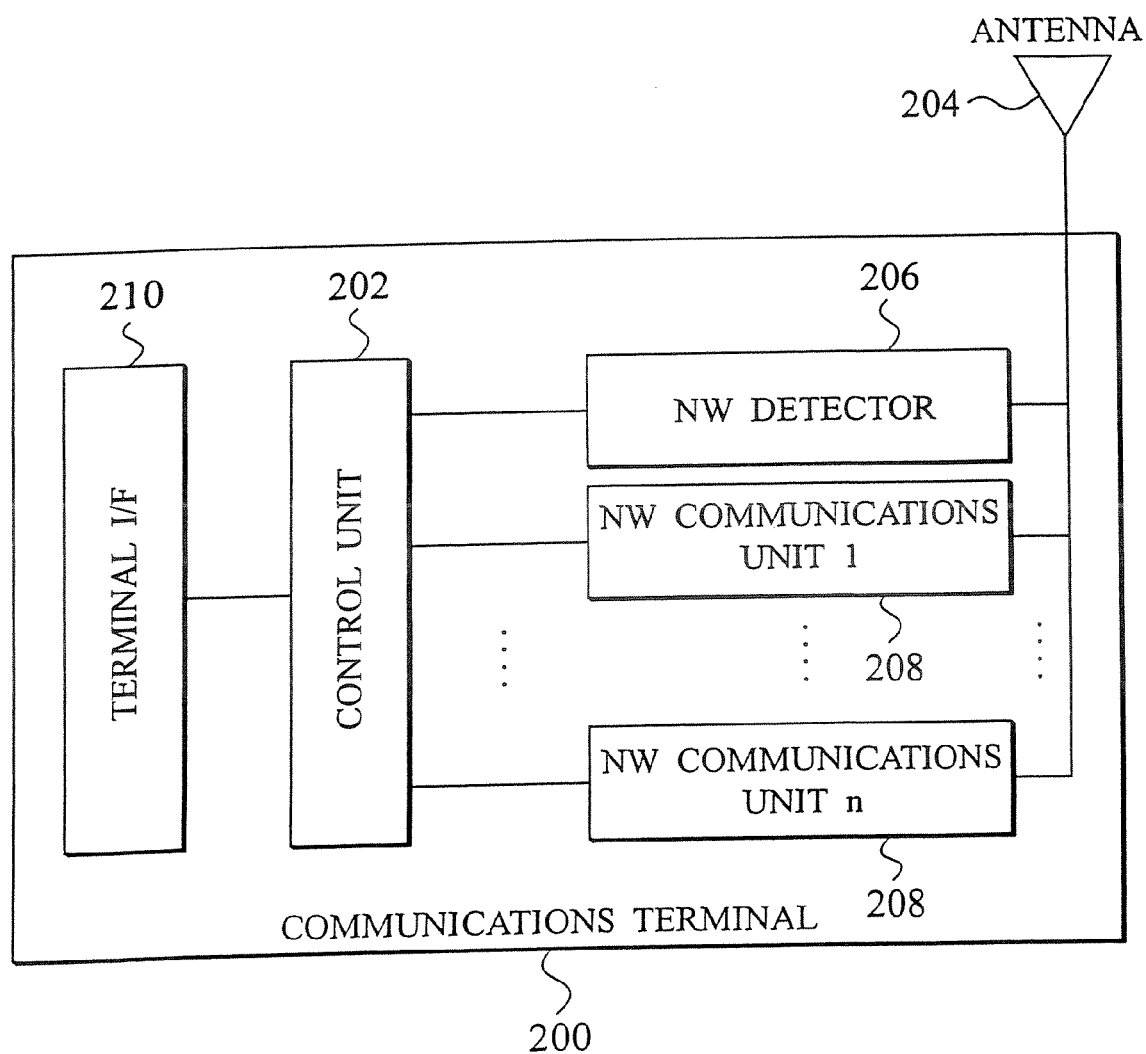

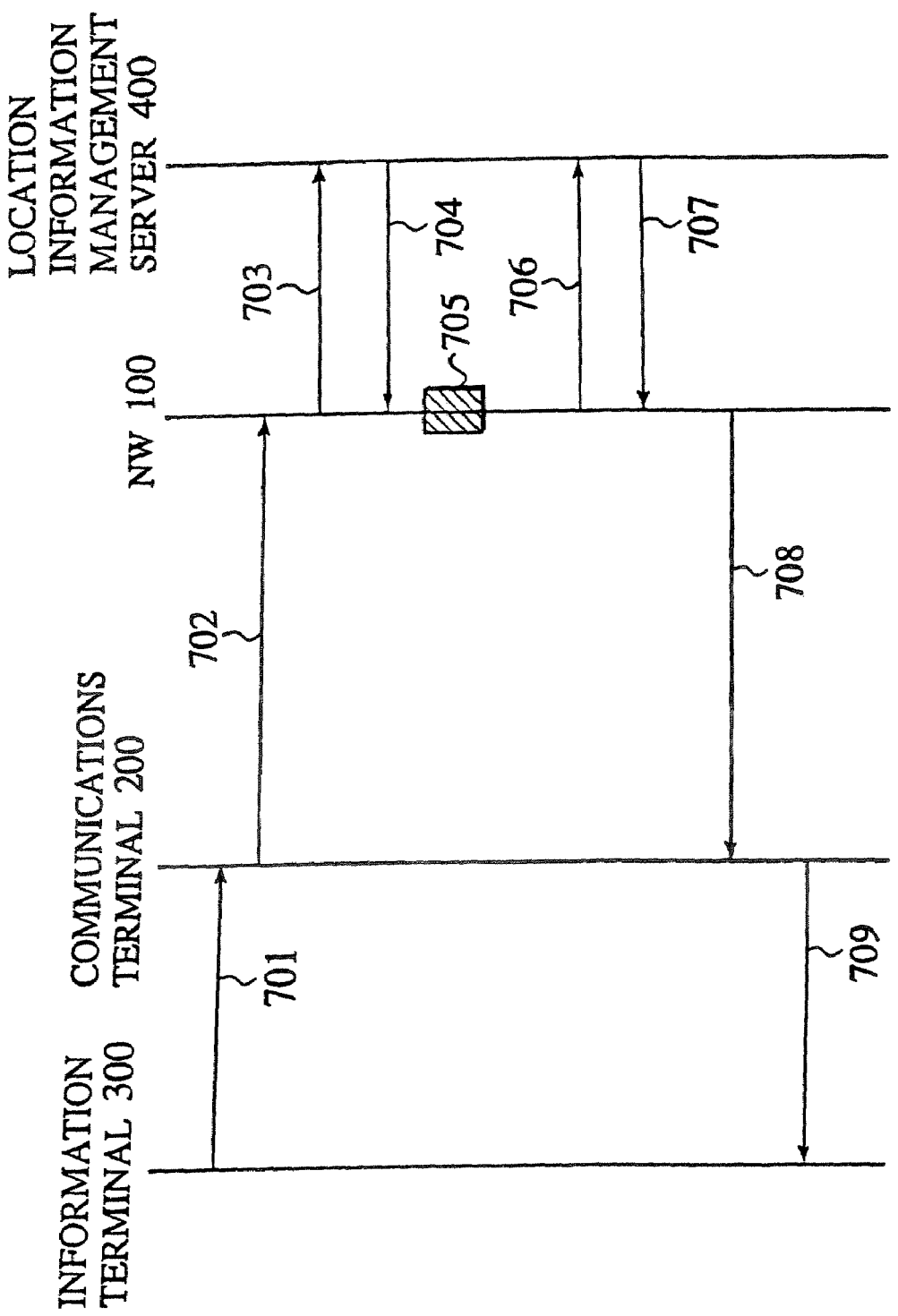

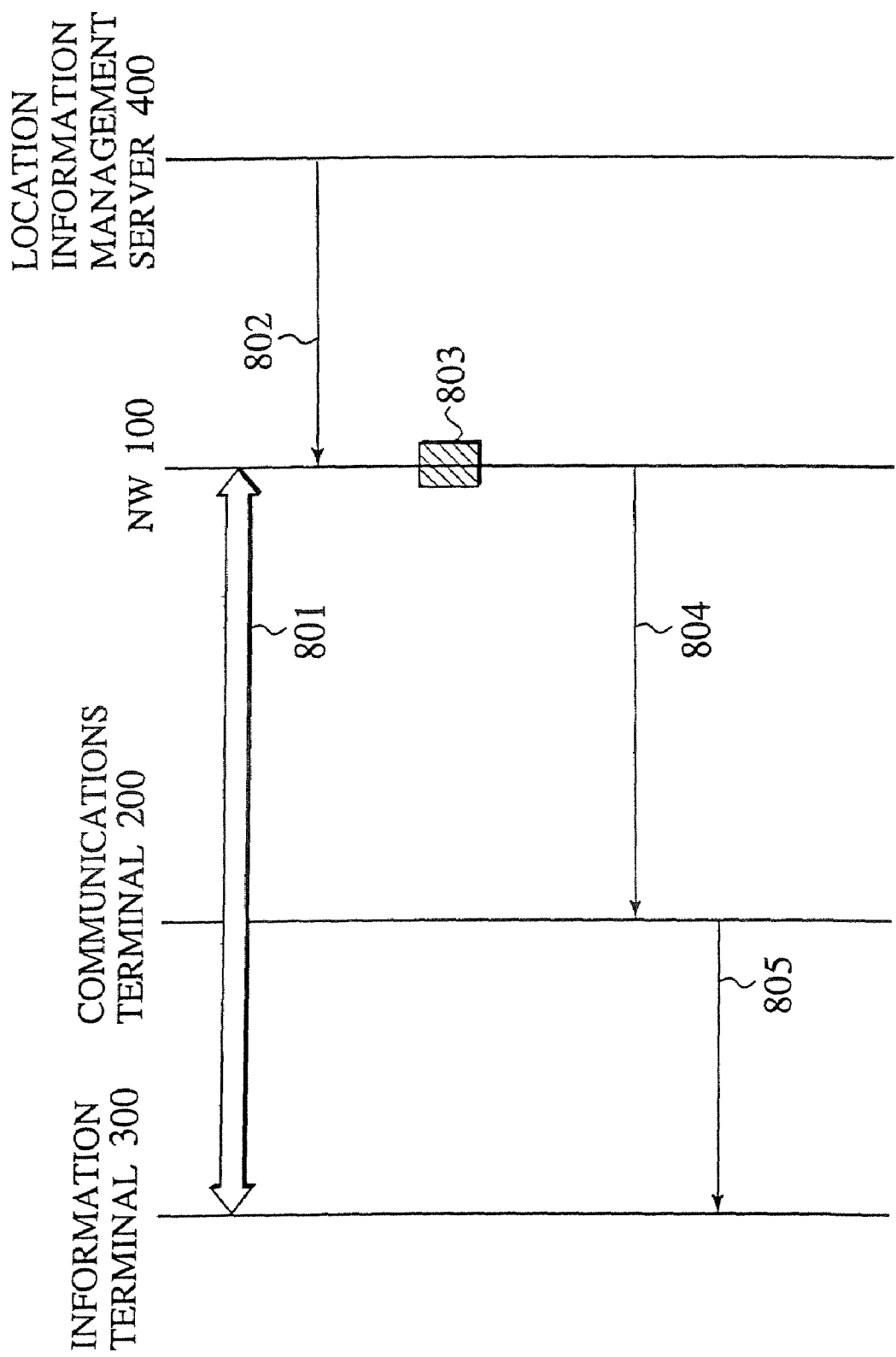

ved a mobile communications system which comprises: a mobile communications terminal; and a mobile communications network controller; the mobile communications network controller comprising: an information acquisition unit for obtaining information regarding resources of a given object; an information memory for storing the obtained information regarding resources of a given object; and an infor-

MOBILE COMMUNICATIONS SYSTEM, MOBILE COMMUNICATIONS NETWORK CONTROLLER, MOBILE COMMUNICATIONS TERMINAL, AND METHOD OF CONTROLLING MOBILE COMMUNICATIONS NETWORK

CROSS REFERENCE TO RELATED APPLICATION

This application is a Divisional Application of Ser. No. 11/203,212 filed Aug. 15, 2005, which is a Divisional Application of Ser. No. 10/191,447 filed on Jul. 10, 2002 and is based upon and claims the benefit of priority from the prior Japanese Patent Application No. P2001-210045, filed on Jul. 10, 2001; the entire contents of which are incorporated herein by reference.

BACKGROUND OF THE INVENTION

1. Field of the Invention

This invention relates to a mobile communications system, a mobile communications network controller, a mobile communications terminal, and a method of controlling a mobile communications network.

2. Description of the Related Art

As conventional mobile communications systems, known are information provision systems in which servers such as WWW servers on the Internet provide various kinds of information to users of mobile terminals (mobile stations). The information provision systems include, for example, the "i-mode service (a service name)" provided by NTT DoCoMo, Inc.

The conventional information provision systems have a problem that users cannot obtain information to receive desired services. For example, although a nearby café has equipment for making a high-quality picture phone call, a user who wants to make such phone call when being in the street cannot get the fact. In another example, even though some fifty meters' walk results in improved radio conditions and relatively higher image quality, a user cannot obtain the information.

Further, the conventional information provision system cannot predict the movement of users. When communications conditions worsen with the movement of a user, that is, when a train bringing the user is about to enter a tunnel, for example, the conventional information providing system cannot enable to know the fact in advance and also cannot provide a seamless service.

SUMMARY OF THE INVENTION

The present invention has been made in view of the above problems, and thus has an object of obtaining in advance information on communications environments in a mobile communications system and providing users with the information regarding communications environments. Another object of the present invention is to predict the movement of users and provide seamless services based on the predictions.

According to a first aspect of the present invention, there is provided a mobile communications system which comprises: a mobile communications terminal; and a mobile communications network controller; the mobile communications network controller comprising: an information acquisition unit for obtaining information regarding resources of a given object; an information memory for storing the obtained information regarding resources of a given object; and an information provision unit for searching the information memory in response to a request for provision of the information regarding resources of a given object transmitted from the mobile communications terminal and providing the information regarding resources of a given object found in the search to the mobile communications terminal; and the mobile communications terminal comprising: an information provision request transmitter for transmitting the request for provision of the information regarding resources of a given object; and an indicator for indicating the information regarding resources of a given object provided from the mobile communications network controller.

According to a second aspect of the present invention, there is provided a mobile communications network controller which comprises: a history information memory for storing history of movement of a mobile communications terminal to a given place; a notification unit for detecting and notifying the movement of said mobile communications terminal to a given place; and a processing unit for performing predetermined processing to a service to be provided to said mobile communications terminal in response to said notification.

According to a third aspect of the present invention, there is provided a mobile communications network controller which comprises: an information acquisition unit for obtaining information regarding resources of a given object; an information memory for storing the obtained information regarding resources of a given object; and an information provision unit for searching the information memory in response to a request for provision of the information regarding resources of a given object and providing the information regarding resources of a given object found in the search.

According to a forth aspect of the present invention, there is provided a mobile communications terminal which comprises: an information provision request transmitter for transmitting a request for provision of information regarding resources of a given object; and an indicator for indicating the information regarding resources of a given object provided by the request.

According to a fifth aspect of the present invention, there is provided a method of controlling a mobile communications network, which comprises the steps of: A) obtaining information regarding resources of a given object at a mobile communications network controller; B) storing the obtained information regarding resources of a given object at the mobile communications network controller; and C) providing, at the mobile communications network controller, a mobile communications terminal with the information regarding resources of a given object searched in response to a request for provision of the information regarding resources of a given object transmitted from the mobile communications terminal.

According to a sixth aspect of the present invention, there is provided a method of controlling a mobile communications network, which comprises the steps of: A) storing, at a mobile communications network controller, history of movement of a mobile communications terminal to a given place; B) detecting and notifying, at the mobile communications network controller, the movement of the mobile communications terminal to a given place; and C) performing predetermined processing, at the mobile communications network controller, to a service to be provided to the mobile communications terminal, in response to the notification.

BRIEF DESCRIPTION OF THE DRAWINGS

FIGS. 3A to 3C illustrate a resource management table of the network controller in the mobile communications system in FIG. 1;

FIG. 4 is a functional block diagram of a communications terminal in the mobile communications system in FIG. 1;

FIG. 7 is a diagram illustrating an exemplary sequence of the provision of desired information by a user's request to the network; and FIG. 8 is a diagram illustrating an exemplary sequence of the provision of information by the network based on the prediction of movement of a user.

DETAILED DESCRIPTION OF THE INVENTION

Figure 1:
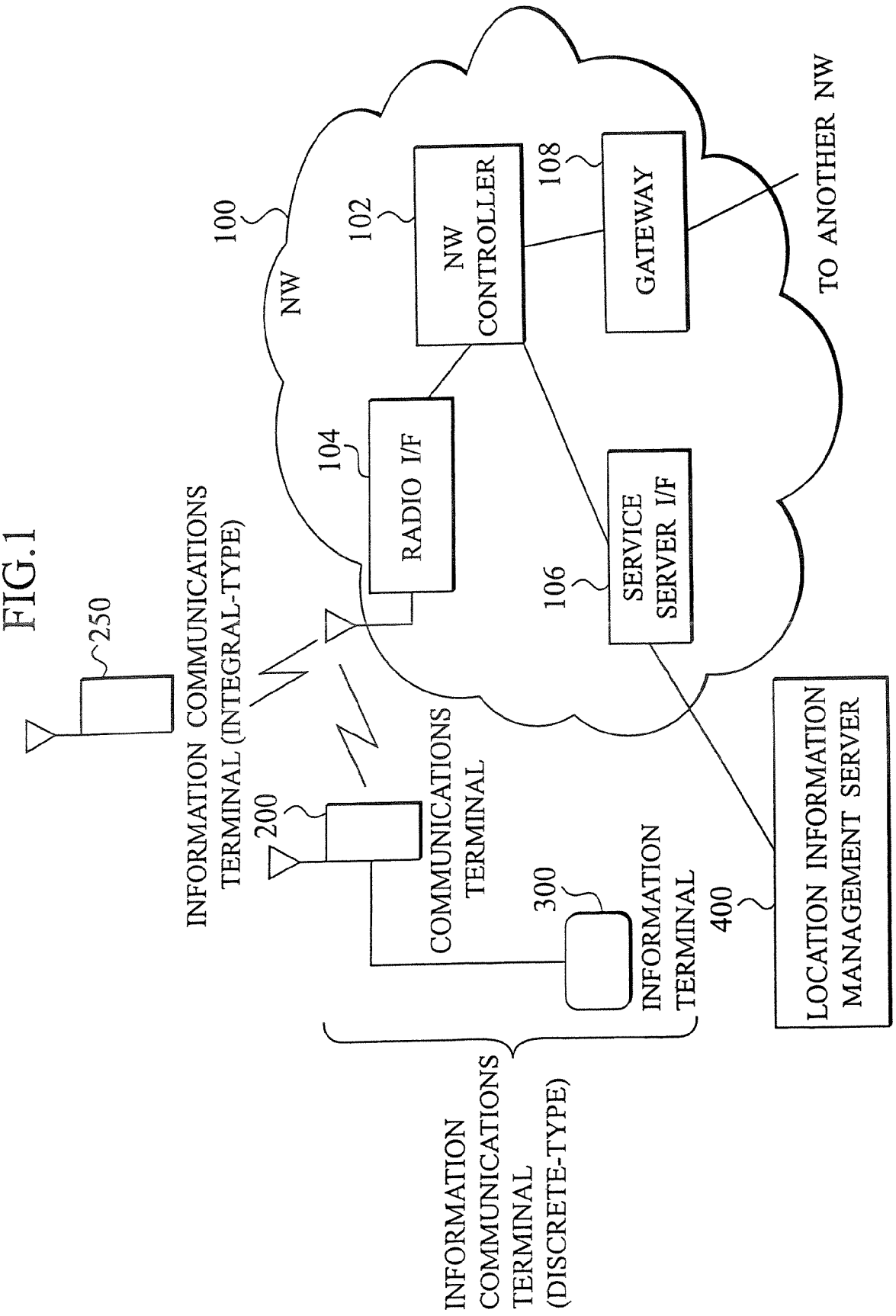
FIG. 1 is a schematic diagram of a mobile communications system according to an embodiment of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

In the following descriptions, numerous specific details are set forth to provide a through understanding of the present invention. However, it will be obvious to those skilled in the art that the present invention may be practiced without such specific details.

Configuration of Mobile Communications System According to an Embodiment of the Present Invention With reference to the accompanying drawings, a mobile communications system according to an embodiment of the present invention will be described in detail below.

FIG. 1 exemplifies a configuration of the mobile communications system of this embodiment, conceptually illustrating only the present invention-related part of the mobile communications system.

The mobile communications system has a network (NW) 100, information communications terminals, and a location information management server 400. The information communications terminals include a discrete-type information communications terminal consisting of a communications terminal 200 and an information terminal 300 connected to the communications terminal 200, and a one-piece information communications terminal 250 with the information and communications terminals united.

The network 100 includes a network controller 102, a radio interface 104, a service server interface 106, and a gateway 108. The network 100 has the function of mutually connecting the communications terminal 200 or the information communications terminal 250 and the location information management server 400 and the function of circuit switching or packet switching in mobile communications.

The network 100 may consist of at least one of the Internet, an intranet, a (wired/wireless) LAN, a (analog/digital) public telephone network, a mobile circuit switched network/mobile packet switched network, a radio paging network, a PHS network, and a satellite communications network, for example.

The network controller 102 is connected to the radio interface 104, the service sever interface 106 and the gateway 108. The network controller 102 has storage for storing a network control program, programs specifying various communications processing procedures, and required data, having the function of centrally controlling the network 100.

Figure 2:
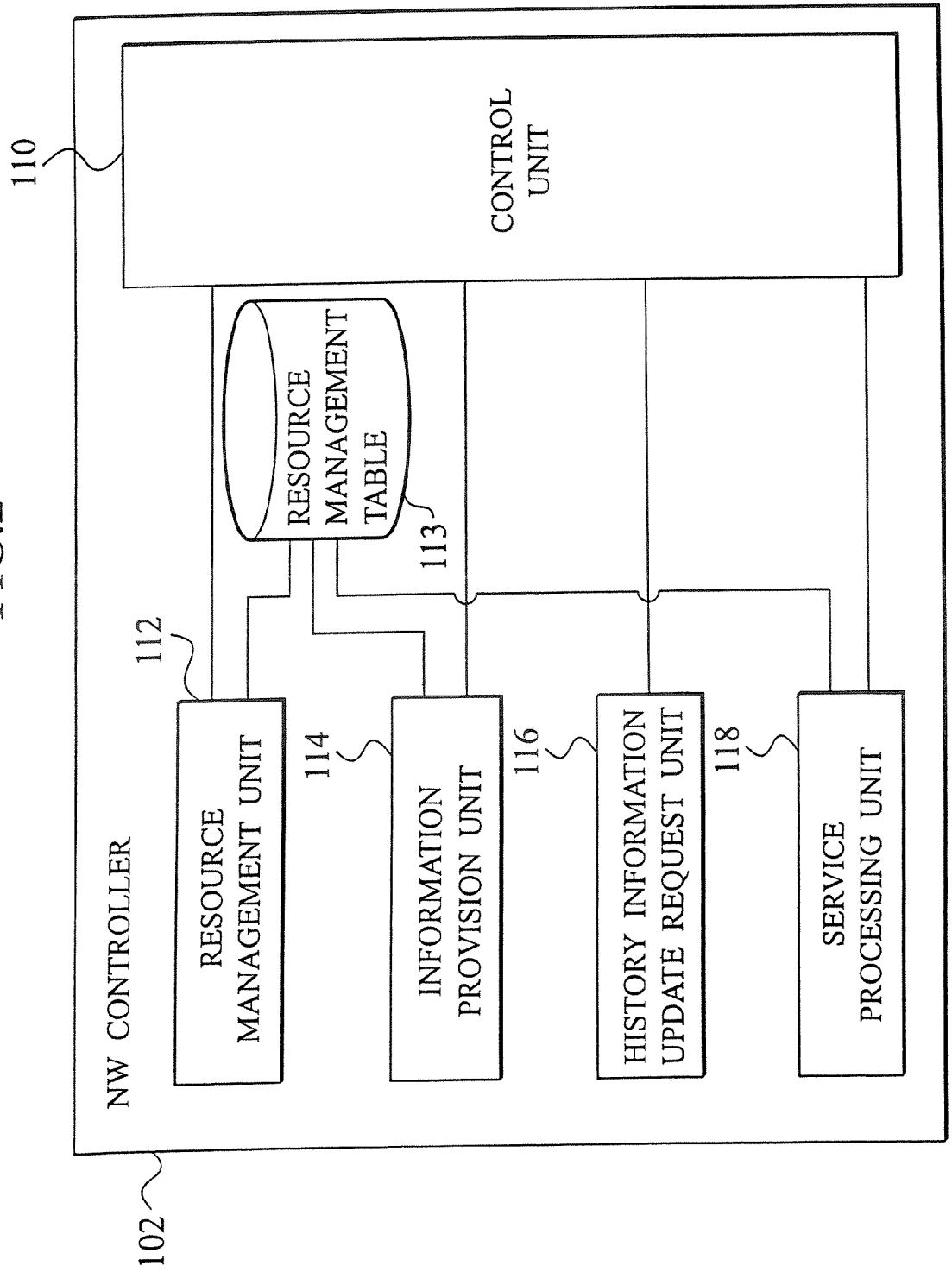
FIG. 2 is a functional block diagram of a network controller in the mobile communications system in FIG. 1.

FIG. 2 exemplifies functional blocks of the network controller 102 shown in FIG. 1, conceptually illustrating only the present invention-related part of the functions of the network controller 102.

The network controller 102 has a control unit 110, a resource management unit 112, a resource management table 113, an information provision unit 114, a history information update request unit 116, and a service processing unit 118, as shown in FIG. 2.

The control unit 110 centrally controls the resource management unit 112, resource management table 113, information provision unit 114, history information update request unit 116 and service processing unit 118 in the network controller 102.

The resource management unit 112 is connected to the control unit 110 and the resource management table 113. The resource management unit 112 has the function of registering/updating (managing) contents of the resource management table 113. The resource management unit 112 is an information acquisition unit having the function of obtaining information regarding resources of given objects from the given objects through the radio interface 104 and performing registration/update (management) for the resource management table 113.

The term "object" herein used means a device such as a communications terminal, computer, information input-output device and a radio communications channel. The term "resource" herein used means a device type, a device installation location (information regarding a latitude/longitude, altitude, elevation, address, and spatial location such as the inside of a vehicle or a building and a floor level), a device function, a battery capacity of a device, a sensing area of a radio communications channel, a radio bandwidth (communications speed) assigned to a radio communications channel, a radio field intensity of a radio communications channel, a delay time of a radio communications channel, fluctuations of a radio communications channel, and so on.

The resource management table 113 is an information memory storing information regarding resources of given objects.

FIGS. 3A to 3C exemplify the resource management table 113.

Referring to FIG. 3A, names of devices, functions of the devices and installation locations (location information) of the devices are stored, being associated with one another. In FIG. 3A, device A has a full screen function and is located in the aaa café. Device B has a printer function and is located in the ccc section of the bbb building. Device C has a hi-fi function and is located in the ddd house.

Referring to FIG. 3B, IDs of radio communications channels, sensing areas of the radio communications channels and radio bandwidths assigned to the radio communications channels are stored, being associated with one another. In FIG. 3B, radio communications channel 1 is sensed in the AA Place and is assigned Xbps as a radio bandwidth. Radio communications channel 2 is sensed in the BB hospital and is assigned Ybps as a radio bandwidth. Radio communications channel 3 is sensed in the CC house and is assigned Zbps as a radio bandwidth.

Referring to FIG. 3C, location information of information communications terminals, kinds of processing the service processing unit 118 is requested to perform when the information communications terminals are in the locations indicated by the location information and start times of the processing are stored, being associated with one another for each user (information communications terminal).

FIG. 3C illustrates a table for user A. In FIG. 3C, when it is determined that user A is in the xxx tunnel, the service processing unit 118 is requested to buffer information to be provided to user A for X seconds after the start time α. Also in FIG. 3C, when it is determined that user A is in the yyy hospital, the service processing unit 118 is requested to convert information to be provided to user A from speech information to text information for Y minutes after the start time β. Also in FIG. 3C, when it is determined that user A is in the zzz house, the service processing unit 118 is requested to transmit maintenance information to user A after the start time γ.

The information provision unit 114 is connected to the control unit 110 and the resource management table 113 to provide desired information in response to information provision requests from users. The information provision unit 114 searches the resource management table 113 based on the location information of users and the contents of information provision requests from the users, and provides desired information in response to the information provision requests from the users.

The information provision unit 114 obtains location information of users from the location information management server 400. The information provision unit 114 may use information included in the information provision requests transmitted from the information communications terminals, as location information of the users.

When receiving a request from a user for provision of information about a device with a full screen function located near, for example, the information provision unit 114 extracts information of device A having the full screen function and located in the vicinity of the current location of the user from the resource management table 113 of FIG. 3A, and provides the user with information of the aaa café as the installation location of the device A. When detecting a plurality of devices having the full screen function and located in the vicinity of the current location of the user, the information provision unit 114 may provide information on any one or more of the devices.

When receiving a request from a user for provision of information on a place near the fff station where communications using Xbps as a radio bandwidth can be made, for example, the information provision unit 114 extracts from the resource management table 113 of FIG. 3B, radio communications channel 1 which can be sensed in sensing area the AA Place where Xbps can be used as a radio bandwidth and which is located in the vicinity of the fff station. The information provision unit 114 then provides the user with information of radio communications channel 1 and the AA Place as a sensing area of the radio communications channel 1.

The information provision unit 114 may transmit the information of the AA Place and the fff station to the location information management server 400, receive, as a response, information on distance between the fff station and the AA Place from the location information management server 400, and provide the distance information to the user.

The history information update request unit 116 is connected to the control unit 116. The history information update request unit 116 notifies the location information management server 400 of history information of users to request the location information management server 400 for update of the history information. Herein the history information is managed by the location information management server 400 and is generated when a user moves to a place where radio communications conditions are bad or reception of speech information is prohibited, for example. The history information includes information such as the fact that user A is in the xxx tunnel, for example.

The service processing unit 118 is connected to the control unit 110 and the resource management table 113. The service processing unit 118 searches the resource management table 113 in accordance with an instruction from the location information management server 400 and performs predetemined processing to a service to be provided to the user based on the search result.

For example, when receiving an instruction from the location information management server 400 to perform predetermined processing for user A coming to the xxx tunnel, the service processing unit 118 searches the resource management table 113 in FIG. 3C, and based on the search result, buffers information to be provided to the user for X seconds after the lapse of time α.

The radio interface 104 is connected to the network controller 102 and has the function of interfacing with the communications terminal 200 and the information communications terminal 250. The service server interface 106 is connected to the network controller 102 and has the function of interfacing with the location information management server 400. The gateway 108 is connected to the network controller 102 and serves as a gateway to another network.

The communications terminal 200 is connected to the information terminal 300 and has the function of performing radio communications with the radio interface 104. The communications terminal 200 maybe any of a radio pager terminal, PHS terminal, mobile terminal, IMT-2000-compliant mobile terminal, personal digital assistant (PDA) with a communication function and the like. The mobile terminal may be a terminal having the E-mail function and the Internet access function (such as an i-mode (service name) terminal provided by NTT DoCoMo, Inc (company name).

FIG. 4 exemplifies functional blocks of the communications terminal 200 shown in FIG. 1, conceptually illustrating only the present invention-related part of the functions of the communications terminal 200.

The communications terminal 200 has a control unit 202, an antenna 204, a network detector 206, network communications units 208, and a terminal interface 210 as shown in FIG. 4.

The control unit 202 has the function of centrally controlling the communications terminal 200 in its entirety. The antenna 204 is connected to the network detector 206 and the network communications units 208 and has the function of performing radio communications with the radio interface 104. The network detector 206 is connected to the control unit 202 and the antenna 204 and has the function of detecting at least one network 100 to which the communications terminal 200 is connected.

The network communications units 208 are connected to the control unit 202 and the antenna 204 and have the function of performing communications with the at least one network 100 detected by the network detector 206. The terminal interface 210 is connected to the control unit 202 and has the function of interfacing with the information terminal 300.

Figure 5:
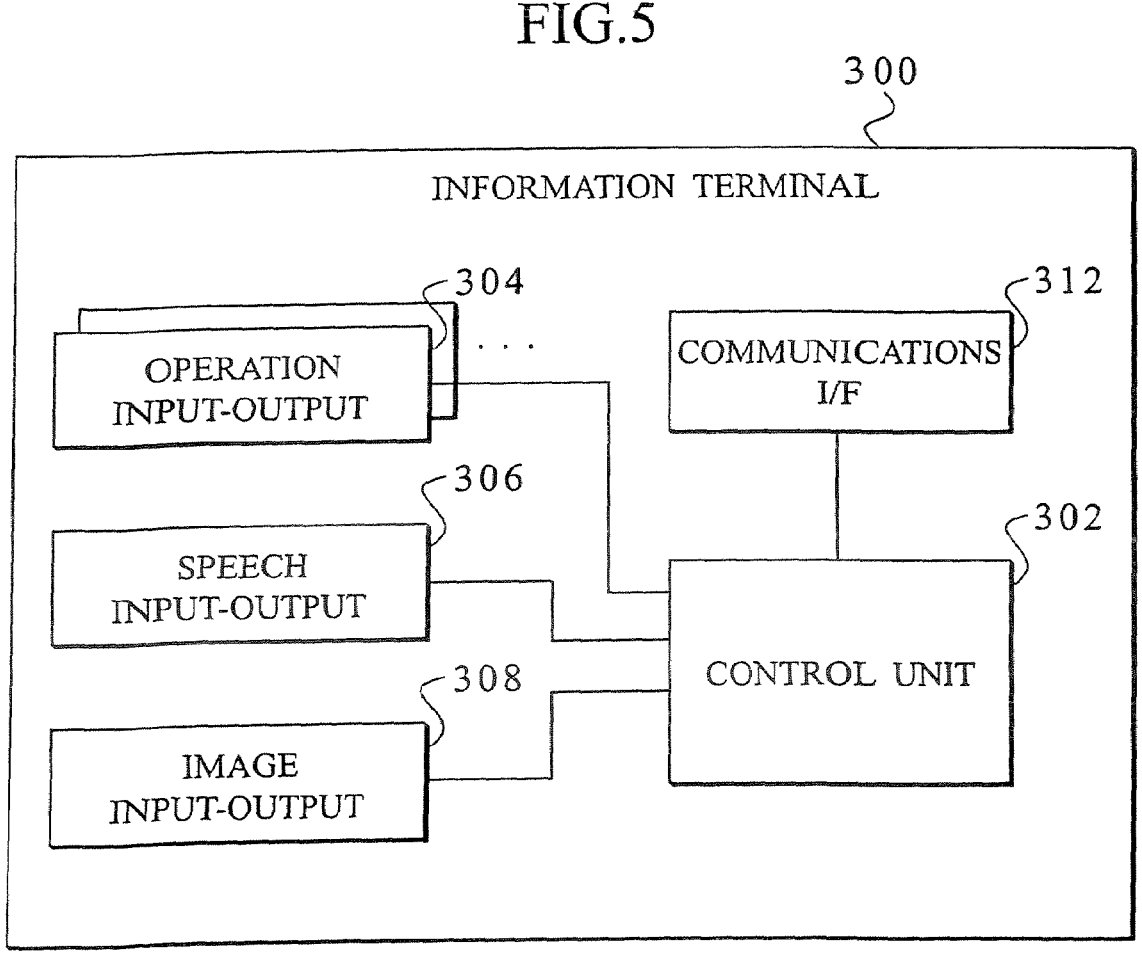
FIG. 5 is a functional block diagram of an information terminal in the mobile communications system in FIG. 1.

The information terminal 300 is connected to the communications terminal 200. The information terminal 300 is a known personal computer, workstation, PDA or the like. FIG. 5 exemplifies function blocks of the information terminal 300 shown in FIG. 1, conceptually illustrating only the present invention-related part of the functions of the information terminal 300.

The information terminal 300 has a control unit 302, an operation input-output 304, a speech input-output 306, an image input-output 308, and a communications interface 312, as shown in FIG. 5.

The control unit 302 has the function of centrally controlling the information terminal 300 as a whole. The control unit 302 has an internal memory for storing a control program such as an OS (operating system), programs specifying various processing procedures, and required data, and performs various kinds of information processing using the programs.

The operation input-output 304 is connected to the control unit 302 and has the function of controlling user-operated various pointing devices such as a mouse, a keyboard, an image scanner, a digitizer and the like. Through the operation input-output 304, the user inputs an information provision request to request the network 100 for the provision of desired information such as information on a nearby place where radio communications conditions are good or information on a nearly-located device having a predetermined function. The operation input-output 304 constitutes an information provision request transmitter of the mobile communications terminal of the present invention.

The speech input-output 306 is connected to the control unit 302 and has the function of inputting/outputting speech. The speech input-output 306 includes a microphone and a speaker, for example. The image input-output 308 is connected to the control unit 302 and has the function of inputting/outputting images. The image input-output 308 includes a video camera, a digital camera and a display, for example.

The communications interface 312 is connected to the control unit 302 and has the function of interfacing with the terminal interface 210 of the communications terminal 200. The speech input-output 306 and the image input-output 308 constitute an indicator of the mobile communications terminal of the present invention.

The information communications terminal 250 in FIG. 1 is a one-piece unit, that is, an integral-type information communications terminal into which the communications terminal 200 and the information terminal 300 are mutually combined as appropriate.

Figure 6:
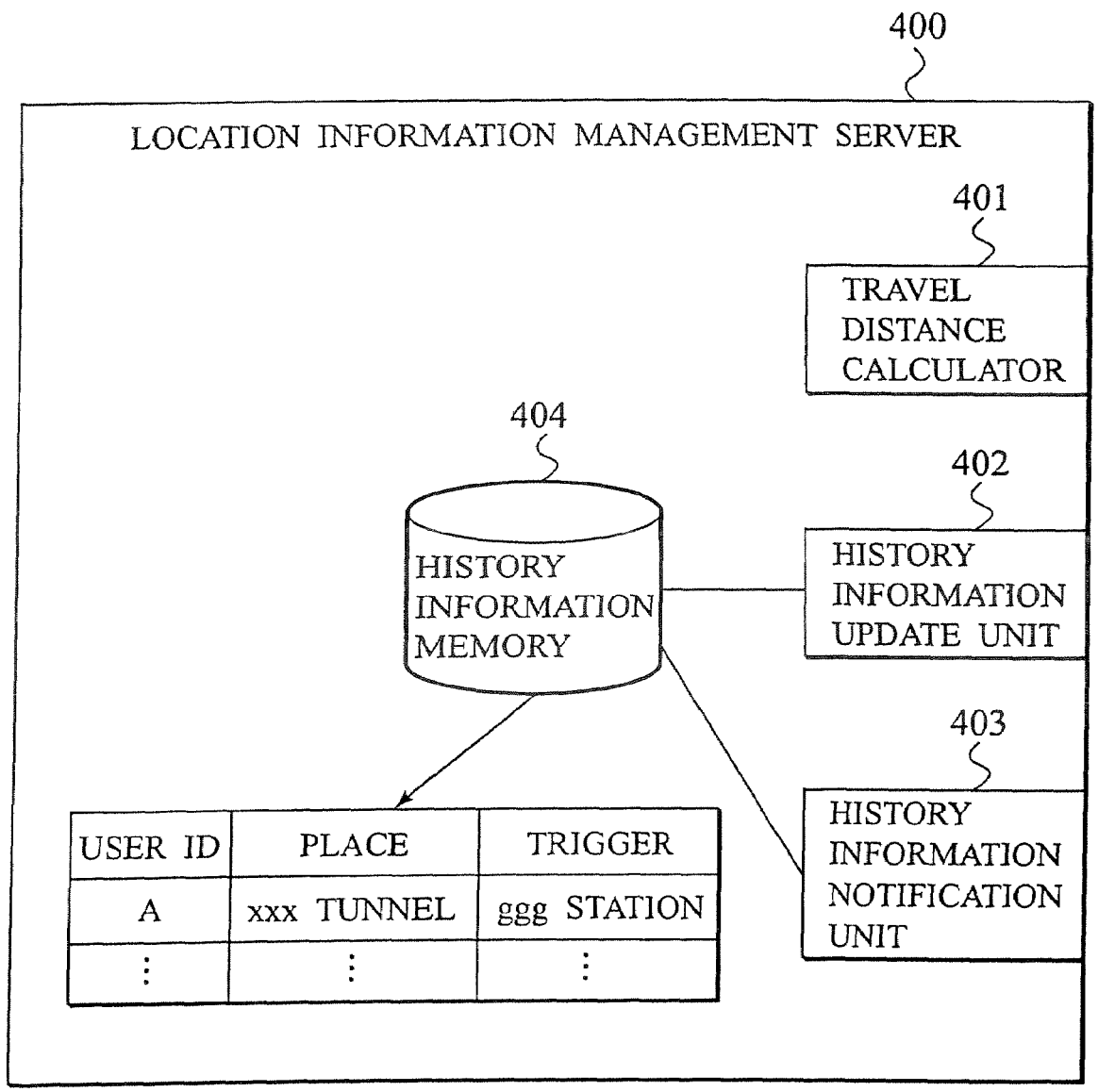
FIG. 6 is a functional block diagram of a location information management server in the mobile communications system in FIG. 1.

The location information management server 400 includes, as shown in FIG. 6, a travel distance calculator 401, a history information update unit 402, a history information notification unit 403, and a history information memory 404. The location information management server 400 manages location information of users (information communications terminals) and performs various kinds of processing based on the location information of the users.

The travel distance calculator 401 is a location information manager for receiving information on a specific place from the information provision unit 114 and calculating the distance between the specific place and the current location of a user.

When receiving information on two specific places from the information provision unit 114, the travel distance calculator 401 calculates the distance between the places. The travel distance calculator 401 provides information regarding a calculated distance to the information provision unit 114.

The history information memory 404 is connected to the history information update unit 402 and the history information notification unit 403. The history information memory 404 is a history information storage means for managing history information for each user. The history information memory 404 associates user IDs, places and triggers, for example, with one another for storage.

The user IDs are for identifying users having information communications terminals. FIG. 6 shows data on user A. The places are information of locations where it is necessary to require the service processing unit 118 for predetermined processing to services to be provided to users. FIG. 6 shows that when user A is in the xxx tunnel, predetermined processing by the service processing unit 118 is required. Triggers are trigger requests to the service processing unit 118 for predetermined processing. FIG. 6 shows that it is determined that user A is in the xxx tunnel when user A is actually at the ggg station and the service processing unit 118 is requested to perform predetermined processing.

The history information memory 404 manages the history information based on frequency in notification by the history information update request unit 116. For example, the history information memory 404 manages only history information notified predetermined times.

The history information update unit 402 is connected to the history information memory 404 and manages the contents of the history information memory 404 based on conditions of resources of given objects notified from the history information update request unit 116.

The history information notification unit 403 is connected to the history information memory 404, and instructs the service processing unit 118 to perform predetermined processing based on the history information stored in the history information memory 404.

The history information notification unit 403 monitors the locations of users. When a user moves to a place set as a trigger, the history information notification unit 403 predicts that the user will move to a place where processing by the service processing unit 118 is required, and notifies the service processing unit 118 of the user's ID and the place, thereby instructing predetermined processing to the service processing unit 118.

Operation of Mobile Communications System of This Embodiment

FIGS. 7 and 8 illustrate the operation of the mobile communications system according to the present embodiment. In the mobile communications system of this embodiment, the resource management unit 112 of the network controller 102 on the network 100 communicates with given objects, obtains information on resources of the given objects, and updates the resource management table 113 based on the obtained information.

I. A user requests the network 100 for desired information.

FIG. 7 exemplifies a sequence in which a user requests, in the mobile communications system of this embodiment, the network 100 for the provision of desired information such as information on a nearly-located device having a full screen function or information on a place near the fff station where communications using Xbps as a radio bandwidth can be performed, conceptually illustrating only the present invention-related part of the sequence.

As shown in FIG. 7, at step 701, the user operates the operation input-output 304 of the information terminal 300, inputting an information provision request on desired information as described above. During the input, the user may or may not perform radio communications using an information communications terminal. The communications interface 312 of the information terminal 300 transmits the information provision request. The terminal interface 210 of the communications terminal 200 receives the information provision request.

At step 702, the network communications unit 208 of the communications terminal 200 transfers the received information provision request to the network 100 via the antenna 204.

The information provision unit 114 of the network controller 102 of the network 100 receives the information provision request.

At step 703, in response to the request from the user, the information provision unit 114 of the network controller 102 requests the location information management server 400 for the provision of location information of the user through the service server interface 106.

At step 704, the location information management server 400 transmits the required location information of the user to the information provision unit 114 of the network controller 102.

At step 705, the information provision unit 114 of the network controller 102 searches the resource management table 113 based on the location information of the user received from the location information management server 400 and the information provision request from the user, and extracts desired information from the resource management table 113.

For example, when the user wants to perform radio communications with a device having a full screen and requests the provision of information on a device for performing such radio communications, the information provision unit 114 of the network controller 102 accesses the resource management table 113 in FIG. 3A and searches for a device located near the current location of the user and having the full screen function. As a result, the information provision unit 114 of the network controller 102 extracts device A and the information of the aaa café where the device A is installed.

When the user request the provision of information on a place near the fff station where communications using Xbps as a radio bandwidth can be performed, for example, the information provision unit 114 of the network controller 102 accesses the resource management table 113 in FIG. 3B and searches for a radio communications channel which allows the use of Xbps as a radio bandwidth at a location near the current location of the user.

As a result, the information provision unit 114 of the network controller 102 extracts information of the AA Place which is located near the current location of the user and is a sensing area of radio communications channel 1.

At step 706, the information provision unit 114 of the network controller 102 transmits the information of the location information (current location) of the user and the aaa café or the information of the AA Place and the fff station to the location information management server 400.

At step 707, the travel distance calculator 401 of the location information management server 400 calculates the distance between the location (current location) of the user and the aaa café or the distance between the AA Place and the fff station, and transmits the calculated distance to the information provision unit 114 of the network controller 102.

At step 708, the information provision unit 114 of the network controller 102 transmits desired information (the information of the aaa café and the information of distance between the user's current location and the aaa café, or the information of the AA Place and the information of distance between the fff station and the AA place, for example) to the communications terminal 200 through the radio interface 104.

At step 709, the terminal interface 210 of the communications terminal 200 transmits the received desired information to the information terminal 300. The communications interface 312 of the information terminal 300 receives the desired information. Based on the kind of the desired information, either of the speech input-output 306 and the image input-output 308 notifies the user of the desired information.

Although the present embodiment has been exemplarily described with the communications terminal 200 and the information terminal 300 as separate bodies, that is, implemented as a discrete-type information communications terminal, the present invention is not limited thereto. A person of ordinary skill in the art would appreciate that in another embodiment, these components can be appropriately combined into a unit, that is, implemented as an integral-type information communication terminal.

II. The network 100 provides information through prediction of movement of a user.

FIG. 8 exemplifies a sequence in which, in the mobile communications system according to the present embodiment, the entering of a train bringing a user into a tunnel is predicted and predetermined processing is performed to a service to be provided to the user based on the prediction, conceptually illustrating only the present invention-related part of the sequence.

In the mobile communications system of this embodiment, the history information update request unit 116 of the network controller 102 periodically notifies the history information update unit 402 of the location information management server 400 of history information of the user. The history information update unit 402 updates the contents of the history information memory 404 accordingly.

At step 801, the user in the train uses an information communications terminal, performing radio communications through the network 100.

At step 802, the history information notification unit 403 of the location information management server 400 monitors the location of the user. When the user moves to a place set as a trigger, the history information notification unit 403 predicts that the user will move to a place where processing of the service processing unit 118 is required and notifies the service processing unit 118 of the user ID and the place (e.g., the xxx tunnel), thereby instructing the service processing unit 118 to perform the predetermined processing.

At step 803, in accordance with the instruction from the location information management server 400, the service processing unit 118 of the network controller 102 searches the resource management table 113, and based on the search result, performs the predetermined processing to a service to be provided to the user.

For example, when receiving an instruction from the location information management server 400 to perform the predetermined processing because user A is coming close to the xxx tunnel, the service processing unit 118 of the network controller 102 searches the resource management table 113 in FIG. 3C, and based on the search result, buffers information to be provided to the user for X seconds after the lapse of time α.

More specifically, when the service provided to the user is the distribution of a motion picture in streaming, the service processing unit 118 of the network controller 102 temporarily increases the compression ratio and pre-buffers data for X seconds before the train passes through the xxx tunnel.

At step 804, the service processing unit 118 of the network controller 102 finishes the buffering when x seconds have elapsed and transmits the buffered information to the communications terminal 200.

At step 805, the terminal interface 210 of the communications terminal 200 transmits the information received by the network communications unit 208 to the information terminal 300. The communications interface 312 of the information terminal 300 receives the information. Depending on the kind of the information, either of the speech input-output 306 and the image input-output 308 provides the information to the user.

Although the present embodiment has been exemplarily described with the communications terminal 200 and the information terminal 300 as separate bodies, that is, implemented as a discrete-type information communications terminal, the present invention is not limited thereto. A person of ordinary skill in the art would appreciate that in another embodiment, these components can be appropriately combined into a unit, that is, implemented as an integral-type information communications terminal.

Modification

Although the above embodiment has been exemplarily described with the components separately implemented, the present invention is not limited thereto. A person skilled in the art would appreciate that a modification can be implemented with the components combined as appropriate.

The above embodiment has been exemplarily described with the network controller 102, radio interface 104, service server interface 106, gateway 108 and location information management server 400 implemented as separate components. The present invention is not limited thereto. A person skilled in the art would appreciate a modification can be implemented with any appropriate combinations of these components.

The above embodiment has been exemplarily described on a service and a system of NTT DoCoMo, Inc (company name). The present invention is not limited thereto, and may be modified to be adapted to a service and a system of another company having similar functions.

In addition to the above embodiment, various modifications are available. As long as being based on the technical ideas described in the appended claims, modifications are considered within the technical scope of the present invention.

Function/Effect of Mobile Communications System of This Embodiment

According to the mobile communications system of the present embodiment, since the information provision unit 114 provides the results of searching the resource management table 113 which stores information on resources of given objects, in response to information provision requests from information communications terminals, users can obtain information to receive desired service.

Further, according to the mobile communications system of the present invention, when the history information notification unit 403 detects the movement of information communication terminals to predetermined locations, the service processing unit 118 performs predetermined processing to services to be provided to the information communications terminals accordingly, resulting in the provision of seamless services based on the predictions of movement of the users.

Further, the present invention allows the pre-acquisition of information on communications environments in the mobile communications system and the provision of the information regarding communications environments to users. Further, the present invention allows the prediction of movement of users and the provision of seamless services based on the predictions.

Various modifications will become possible for those skilled in the art after receiving the teachings of the present disclosure without departing from the scope thereof.

What is claimed is:

1. A network controller comprising:

a resource management unit configured to manage an ID of a device, a function of the device and a location of the device, in association with one another, based on information obtained from the device via a radio interface; and an information provision unit configured to obtain a location of an external information user terminal in accordance with a request transmitted from the external information user terminal for provision of information relative to the device having a desired function located in a vicinity of the external information user terminal, to extract an ID of said device which is associated with the desired function included in the request and to extract the location of said device which is associated with the extracted ID located in the vicinity of the obtained location of the external information user terminal from the resource management unit, and to provide the location of the device to the external information user terminal.

2. A network controller comprising:

a resource management unit configured to manage an ID of a radio communications channel, a sensing area of the radio communications channel and a radio bandwidth assigned to the radio communications channel, in association with one another, based on information obtained via a radio interface; and an information provision unit configured to obtain a location of an external information user terminal in accordance with a request transmitted from the external information user terminal for provision of information relative to a radio communications channel having a desired radio bandwidth in a vicinity of the external information user terminal, to extract an ID of a radio communications channel which is associated with said desired radio bandwidth included in the request and to extract the sensing area of said radio communications channel which is associated with the extracted ID located in the vicinity of the obtained location of the external information user terminal from the resource management unit, and to provide the sensing area of the radio communications channel associated with the extracted ID of the radio communications channel to the external information user terminal.

* * * * *